United States Patent Office 3,095,398

Patented June 25, 1963

3,095,398

PROCESS OF INCREASING THE PARTICLE SIZE OF SYNTHETIC RUBBER LATEX

Louis H. Howland, Watertown, and Victor S. Chambers, Naugatuck, Conn., assignors to United States Rubber Company, New York, N.Y., a corporation of New Jersey No Drawing. Filed Jan. 28, 1960, Ser. No. 5,100

16 Claims. (Cl. 260—29.7)

This invention relates to the preparation of synthetic rubber latices of large particle size, particularly to permit them to be concentrated to fluid latices of high solids content.

We have found that treating a synthetic rubber latex containing unreacted polymerizable monomeric material with a small amount of polyvinyl alcohol at a temperature from 0° C. to 15° C. before removing unreacted monomers, results in a latex having a greatly increased particle size over the same latex without the polyvinyl alcohol treatment. Such latices that have been treated with polyvinyl alcohol in the presence of unreacted monomers may readily be concentrated, preferably by evaporation concentration, to fluid high solids latices.

In carrying out the present invention, the emulsion of synthetic rubber forming monomers is polymerized to a latex of a conversion of 60% to 95%, and the latex is treated with a small amount of polyvinyl alcohol at a temperature of 0° C. to 15° C. in the presence of at least 5% of unreacted polymerizable monomers based on the weight of the original synthetic rubber forming monomers. The time of treatment is not critical. The polyvinyl alcohol may be added to the latex with or after the shortstopping agent after the desired conversion of 60% to 95%, and the residual monomers may then be removed. If the polyvinyl alcohol is added to the initial emulsion of monomers, it may be in contact with the latex for a time to carry out the polymerization generally not more than 24 hours. The polyvinyl alcohol may be added at any intemediate stage of the polymerization. The temperature of the treatment with polyvinyl alcohol should be between 0° C. and 15° C. since treatments at higher temperatures do not give appreciable increase in particle size. Therefore, the invention is particularly useful in low temperature polymerizations between 0° C. and 15° C., since it is difficult to cool a high temperature polymerization batch for treatment with polyvinvyl alcohol before stripping unreacted monomers. There must be at least 5% of unreacted polymerizable monomers, based on the weight of original synthetic rubber forming monomers, present in the latex at the time of treatment with the polyvinyl alcohol, otherwise increase in particle size will not result. The unreacted monomers present with the polyvinyl alcohol may be all the unreacted monomers after the desired conversion or only part of them as where volatile monomers, such as butadiene-1,3 are vented from the latex before addition of the polyvinyl alcohol, provided at least 5% of higher boiling monomers, such as styrene, remain for the polyvinyl alcohol treatment, after which such higher boiling monomers may be stripped from the latex as by steam distillation. The amount of polyvinyl alcohol added to the latex in the presence of at least 5% of unreacted polymerizable monomers based on the weight of original synthetic rubber forming monomers will be from 0.02 to 2 parts, and preferably from 0.05 to 1 part, per 100 parts of original rubber forming monomers. The latex conventionally have a solids content of 20% to 50% and may be concentrated to a solids content of 55% to 70%, giving a fluid high solids latex. The latex may be concentrated by increasing the solids content in known manner as by creaming with a vegetable mucilage, such as ammonium alginate. It is preferred however, to increase the solids content by evaporation concentration. Unreacted monomers may be stripped from the latex by the evaporation concentration.

Polyvinyl alcohols are generally graded by the viscosity in centipoises of a 4% solution of the polyvinyl alcohol in water at 20° C. Any of the conventional polyvinyl alcohols having a viscosity in 4% aqueous solution at 20° C. from 4 to 70 centipoises may be used in the present invention. An example of a commercial low viscosity type polyvinyl alcohol is one having a viscosity of 4 to 6 centipoises in 4% aqueous solution at 20° C. An example of a commercial medium viscosity type polyvinyl alcohol is one having a viscosity of 20 to 30 centipoises in 4% aqueous solution at 20° C. An example of a commercial high viscosity type polyvinyl alcohol is one having a viscosity of 45 to 70 centipoises in 4% aqueous solution at 20° C.

The synthetic rubber latex may be an aqueous emulsion polymerizate of one or more butadienes-1,3, for example, butadiene-1,3, 2-methylbutadiene-1,3 (isoprene), 2,3-dimethyl-butadiene-1,3, piperylene, or a mixture of one or more such butadienes-1,3, with one or more other polymerizable compounds which are capable of forming rubbery copolymers with butadienes-1,3, for example, up to 70% by weight of such mixture of one or more monoethylenic compounds which contain a $CH_2=C<$ group where at least one of the disconnected valences is attached to an electro-negative group, that is, a group which substantially increases the electrical dissymmetry or polar character of the molecule. Examples of compounds which contain a $CH_2=C<$ group and are copolymerizable with butadienes-1,3 are aryl olefines, such as styrene, vinyl toluene, alpha methyl styrene, chlorostyrene, dichlorostyrene, vinyl naphthalene; the alpha methylene carboxylic acids and their esters, nitriles and amides, such as acrylic acid, methyl acrylate, methyl methacrylate, acrylonitrile, methacrylonitrile, methacrylamide; vinyl pyridines, such as 2-vinyl pyridine, 2-methyl-5-vinyl pyridine; methyl vinyl ketone; vinylidene chloride. Such a synthetic rubber latex may be termed a "butadiene polymer synthetic rubber latex." The polymerization receipe will contain the usual 2% to 15% of one or a mixture of anionic surface-active dispersing agents based on the weight of polymerizable monomers. When the polyvinyl alcohol is included in the polymerization recipe, it is not the emulsifier for the rubber forming monomers but is in addition to the usual 2% to 15% anionic surface-active dispersing agent based on the weight of polymerizable monomers. Thus the anionic surface-active dispersing agent will be in amount at least equal to the maximum amount of polyvinyl alcohol and generally will be in amount greatly in excess of the amount of polyvinyl alcohol used. Such anionic surface-active dispersing agents may be water-soluble soaps of soap-forming monocarboxylic acids, such as alkali-metal, ammonium or amine salts of higher fatty acids having 10 to 24 carbon atoms in the molecule or of rosin acids, including hydrogenated, dehydrogenated and disproportionated rosin acids. The anionic surface-active dispersing agents may be sulfonated or sulfated compound having the general formula $R—SO_3M$ or $R—OSO_3M$, where M represents alkali-metal, ammonium or amine radical, and R represents an organic radical containing a group having 9 to 23 carbon atoms, such as alkyl sulfonates, e.g. dodecyl sodium sulfonate; alkyl sulfates, e.g. sodium oleyl sulfate; alkyl aryl sulfonates, e.g. dodecyl benzene sulfonate; alkyl sulfosuccinates, e.g. dioctyl sodium sulfosuccinate; aryl sulfonate-formaldehyde condensation products, e.g. condensation product of sodium naphthalene sulfonate and formaldehyde.

The following examples illustrate the invention. All parts and percentages referred to herein are by weight.

*Example 1*

Three 24-ounce glass bottle reactors (A, B and C) were loaded with the following ingredients: 70 parts of butadiene-1,3; 30 parts of styrene; 0.20 part of sodium formaldehyde sulfoxylate; 0.15 part of diisopropylbenzene hydroperoxide; 0.015 part of ferrous sulfate heptahydrate; 0.030 part of the tetrasodium salt of ethylene diamine tetraacetic acid; 3.0 parts of potassium oleate; 0.50 part of a condensation product of sodium naphthalene sulfonate and formaldehyde dispersing agent; 0.03 part of sodium dithionite; 0.1 part of tertiary dodecyl mercaptan; and 142 parts of water. The mixtures were agitated by end over end rotation at 5° C. Latices A, B and C were polymerized to 74.5%, 71.0% and 71.5% conversion, respectively, at which time 0.2 part of potassium dimethyldithiocarbamate shortstop in 20 parts of water was added to latex A, 0.2 part of potassium dimethyldithiocarbamate and 0.2 part of polyvinyl alcohol in 20 parts of water were added to latex B, and 0.2 part of potassium dimethyldithiocarbamate and 1.0 part of polyvinyl alcohol in 20 parts of water were added to latex C. The polyvinyl alcohol was a low viscosity type having a viscosity of 4 to 6 centipoises in a 4% aqueous solution at 20° C. Bottles A and B were allowed to stand 16 hours and bottle C was allowed to stand 4 hours before opening and venting the unreacted butadiene.

The average particle diameters of the thus treated latices A, B and C were 420, 1440, and 1470 angstrom units, respectively, showing the great increase in particle size on addition of the polyvinyl alcohol to the latex before removing unreacted monomers.

*Example 2*

This example shows that incorporating polyvinyl alcohol before removing residual monomers from a large particle size latex made in known manner by including an alkali salt electrolyte in the polymerization recipe will give a latex of greatly increased particle size enlargement over the increase in particle size due to the salt.

Three 24-ounce glass bottle reactors (D, E and F) were loaded with the following ingredients: 70 parts of butadiene-1,3; 30 parts of styrene; 0.20 part of sodium formaldehyde sulfoxylate; 0.15 part of di-isopropylbenzene hydroperoxide; 0.015 part of ferrous sulfate heptahydrate; 0.030 part of the tetrasodium salt of ethylene diamine tetraacetic acid; 3.0 parts of potassium oleate; 0.50 part of a condensation product of sodium naphthalene sulfonate and formaldehyde dispersing agent; 0.75 part of sodium sulfate; 0.03 part of sodium dithionite; 0.1 part of tertiary dodecyl mercaptan; and 150 parts of water. The mixtures were agitated by end over end rotation at 5° C. Latices D, E and F were polymerized to 53.5%, 55.6% and 56.2% conversion, respectively, at which time 0.2 part of potassium dimethyldithiocarbamate shortstop in 20 parts of water was added to bottle D, 0.2 part of potassium dimethyldithiocarbamate and 0.2 part of polyvinyl alcohol in 20 parts of water were added to bottle E, and 0.2 part of potassium dimethyldithiocarbamate and 1 part of polyvinyl alcohol in 20 parts of water were added to bottle F. The polyvinyl alcohol was the same as that used in Example 1. Bottles D and E were allowed to stand 4 hours and bottle F was allowed to stand 16 hours before opening and venting the unreacted butadiene.

The average particle diameters of the thus treated latices D, E and F were 1050, 1520 and 1830 angstrom units, respectively, showing the increase in particle size on incorporation of sodium sulfate in the polymerization recipe (comparison of latex D with latex A of example 1), and the increase in the particle size of latex D by addition of the polyvinyl alcohol to the latex before removing unreacted monomers as shown in latices E and F.

*Example 3*

This example shows that incorporating polyvinyl alcohol and a salt in the latex before removing residual monomers will give a latex of greatly increased particle size enlargement over the known enlargement in particle size due to the incorporation of the salt in the latex.

The same polymerization recipe was used for latices G and H as was used for latices A, B and C in Example 1, and the mixtures were agitated by end over end rotation at 5° C. Latices G and H were polymerized to 75.8% and 75.3% conversion, respectively, at which time 0.2 part of potassium dimethyldithiocarbamate shortstop and 0.75 part of potassium sulfate in 20 parts of water was added to bottle G, and 0.2 part of potassium dimethyldithiocarbamate and 0.75 part of potassium sulfate and 0.2 part of the low viscosity polyvinyl alcohol used in Example 1 was added to bottle H. Bottles G and H were allowed to stand 4 hours before opening and venting the unreacted butadiene.

The average particle diameters of the thus treated latices G and H were 1250 and 1860 angstrom units respectively, showing the increase in particle size on addition of the sodium sulfate (comparison of latex G with latex A of Example 1), and the increase in particle size of latex D by addition of the polyvinyl alcohol to the latex before removing unreacted monomers as shown in latex H.

The amount of alkali salt electrolyte added to the polymerization recipe as shown in Example 2, and/or the amount of alkali salt electrolyte added to the latex before removing unreacted monomers as shown in Example 3, where it is desired to add such salt, may be from 0.2% to 2%, based on the weight of original rubber forming monomers. Such alkali salt electrolyte may be an alkali (potassium, sodium, ammonium or amine) salt of an acid such as carbonic, formic, acetic, sulfuric, hydrochloric, nitric or phosphoric acids. Examples of alkali salt electrolytes that may be used are ammonium carbonate, ammonium bicarbonate, methyl amine carbonate, dimethylamine carbonate, sodium formate, potassium acetate, sodium sulfate, potassium sulfate, sodium chloride, potassium chloride, sodium nitrate, and trisodium phosphate. Such alkali salt electrolyte is in addition to the very small amounts of electrolyte that may be present in the latex from the catalysts, activators, sequesting agents, oxygen scavengers, emulsifiers and stabilizers in the polymerization recipe.

*Example 4*

In run J, a 24-ounce glass bottle reactor was loaded with the following ingredients: 70 parts of butadiene-1,3; 30 parts of styrene; 0.10 part of sodium formaldehyde sulfoxylate; 0.10 part of di-isopropylbenzene hydroperoxide; 0.015 part of ferrous sulfate heptahydrate; 0.030 part of the tetrasodium salt of ethylene diamine tetraacetic acid; 3.0 parts of potassium oleate; 0.50 part of a condensation product of sodium naphthalene sulfonate and formaldehyde dispersing agent; 0.75 part of sodium sulfate; 0.005 part of hydroquinone; 0.1 part of tertiary dodecyl mercaptan; and 100 parts of water. The mixture was agitated by end over end rotation at 5° C. The conversion of the monomers into polymer was followed by periodically measuring the percent solids of the polymerizing system. When the conversion had reached approximately 36%, 20 parts of water were added. The polymerization was shortstopped with 0.2 part of potassium dimethyldithiocarbamate after 10 hours at 88% conversion. A very viscous latex of a viscosity over 3000 centipoises measured at approximately 25° C. was obtained with a solids content of 42.8%. The average particle diameter was 720 angstrom units.

Run K was similar to run J except that at approximately 41% conversion 0.1 part of polyvinyl alcohol as a 5% dispersion and a total of 20 parts of water were added. The polyvinyl alcohol dispersion had been prepared by stirring 50 grams of a low viscosity type polyvinyl alcohol having a viscosity of 4 to 6 centipoises in a 4% aqueous solution at 20° C. into about 500 grams of cold water and heating the stirred mixture at 60°–70° C. for about 30 minutes, and then diluting to one liter with more water. The polymerization was shortstopped with 0.2 part of potassium dimethyldithiocarbamate after 10 hours at 82% conversion. A fluid latex was obtained whose average particle diameter was 1530 angstrom units. The latex was concentrated by evaporation concentration in a laboratory disc concentrator at 35° to 40° C. to a solids content of 60% and a viscosity of 540 centipoises measured at approximately 25° C.

*Example 5*

In run L, a 24-ounce glass reactor was loaded with the following ingredients: 70 parts of butadiene-1,3; 30 parts of styrene; 0.20 part of sodium formaldehyde sulfoxylate; 0.15 part of di-isopropylbenzene hydroperoxide; 0.015 part of ferrous sulfate heptahydrate; 0.030 part of the tetrasodium salt of ethylene diamine tetraacetic acid; 3 parts of potassium oleate; 0.5 part of a condensation product of sodium naphthalene sulfonate and formaldehyde dispersing agent; 0.75 part of sodium sulfate; 0.03 part of sodium dithionite; 0.1 part of tertiary dodecyl mercaptan; and 130 parts of water. The mixture was agitated by end over end rotation at 5° C. The conversion of monomers into polymer was followed as described in Example 1. When the conversion had reached approximately 42%, 20 parts of water were added. The conversion was shortstopped after 24 hours at 76% conversion with 0.2 part of potassium dimethyldithiocarbamate in 10 parts of water. The reactor was allowed to stand approximately 16 hours and the unreacted butadiene was then vented off. The average particle diameter of the latex was 620 angstrom units.

Run M was similar to run L except that after 24 hours at 84% conversion a solution of 0.2 potassium dimethyldithiocarbamate shortstop, 0.2 part of polyvinyl alcohol (as 5% dispersion prepared as in Example 1), and a total of 10 parts of water were added. The reactor was allowed to stand approximately 16 hours and the unreacted butadiene was then vented off. The average particle diameter of the latex was 1420 angstrom units.

Run N was similar to run L except that the shortstop solution without any polyvinyl alcohol was added after 24 hours at 83% conversion and the polyvinyl alcohol was not added until after the butadiene was vented off. The reactor was allowed to stand approximately 16 hours. The average particle diameter of the latex was 1080 angstrom units.

Run O was similar to run L except that 100 parts of butadiene was used in place of the 70/30 butadiene/styrene mixture and the 20 parts more of water were added at 43% conversion. The polymerization was shortstopped after 10 hours at 71% conversion with 0.2 part of potassium dimethyldithiocarbamate and the average particle size was measured after venting the remaining butadiene monomer. The average particle diameter was 880 angstrom units.

Run P was similar to run O except that a 5% aqueous dispersion of 0.1 part of polyvinyl alcohol along with the 20 parts of water were added at 43% conversion and the polymerization was shortstopped after 10 hours at 69% conversion. The average particle diameter after venting the butadiene was 1560 angstrom units.

Run Q was similar to run L except that 50 parts of butadiene and 50 parts of styrene were used as the monomers and the 20 parts more of water were added at 78% conversion. The polymerization was shortstopped after 8 hours at 93% conversion. The average particle diameter after venting the butadiene was 560 angstrom units.

Run R was similar to run Q except that a 5% aqueous dispersion of 0.1 part of polyvinyl alcohol along with the 20 parts of water were added at 71% conversion and the polymerization was shortstopped after 8 hours at 86% conversion. The average particle size after venting the butadiene was 1560 angstrom units.

Run S was similar to run L except that 30 parts of butadiene and 70 parts of styrene were used as the monomers and the 20 parts more of water were added at 79% conversion. The polymerization was shortstopped after 8 hours at 93% conversion. The average particle size after venting the butadiene was 600 angstrom units.

Run T was similar to run S except that a 5% aqueous dispersion of 0.1 part of polyvinyl alcohol along with the 20 parts of water were added at 75% conversion. The polymerization was shortstopped after 8 hours at 90% conversion. The average particle size after venting the butadiene was 1300 angstrom units.

*Example 6*

This example shows that polyvinyl alcohol alone does not increase the particle size of synthetic rubber latex from which the unreacted monomers have been removed.

A commercial latex polymerized at 5° C. to 80% conversion with the following recipe was used, the figures representing parts by weight: Butadiene 72, styrene 28, sodium formaldehyde sulfoxylate 0.12, diisopropyl benzene hydroperoxide 0.1, ferrous sulfate heptahydrate 0.011, tetrasodium salt of ethylene diamine tetraacetic acid 0.044, potassium soap of disproportionated rosin acids 1.75, potassium oleate 2.75, condensation product of sodium naphthalene sulfonate and formaldehyde dispersing agent 0.5, potassium sulfate 0.5, sodium hydrosulfide 0.03, mixed tertiary ($C_{12}$ to $C_{16}$) mercaptans 0.09, and water 155 parts. This was shortstopped at about 80% conversion with 0.2 potassium dimethyl dithiocarbamate and 0.02 part potassium soap of higher fatty acids. Unreacted butadiene was vented off and unreacted residual styrene was removed by steam distillation in the conventional manner.

To four samples U, V, W, and X of this latex was added 2 parts per hundred of rubber latex solids of the condensation product of sodium naphthalene sulfonate and formaldehyde dispersing agent as a 10% aqueous solution. To three of these samples V, W, and X was added 0.2, 1.0, and 9.0 parts per hundred of latex solids of a polyvinyl alcohol which has a viscosity in 4% aqueous solution of 4 to 6 centipoises as a 10% solution. These mixtures were heated at 50° C. for one hour, cooled and the particle size determined. The particle sizes of the thus treated latices U, V, W, and X were 820, 840, 830 and 850 angstrom units, respectively, showing that polyvinyl alcohol alone does not increase the particle size of synthetic rubber latex.

The latices of increased particle size accordingly to the present invention, particularly of high solids content, may be used in the usual applications of latices, as in foam sponge manufacture, tire cord dipping, bonding and impregnating various materials, preparation of adhesives, and the like.

This application is a continuation-in-part of our application Serial No. 776,743, filed November 28, 1958, now abandoned.

In view of the many changes and modifications that may be made without departing from the principles underlying the invention, reference should be made to the appended claims for an understanding of the scope of the protection afforded the invention.

Having thus described our invention, what we claim and desire to protect by Letters Patent is:

1. The method which comprises treating a synthetic rubber latex which is an aqueous emulsion polymerizate of synthetic rubber forming monomeric material selected from the group consisting of butadiene-1,3, isoprene, 2,3-dimethyl butadiene-1,3, and piperylene, and mixtures thereof, and mixtures of such butadienes-1,3 with up to 70% by weight of such mixtures of monoethylenic compounds which contain a $CH_2=C<$ group and are copolymerizable with butadienes-1,3, and which has been polymerized to a latex of 60% to 95% conversion, in the presence of at least 5% of residual unreacted polymerizable monomeric material based on the weight of the original synthetic rubber forming monomeric material with 0.02 to 2 parts of polyvinyl alcohol per 100 parts by weight of original synthetic rubber forming monomeric material at a temperature from 0° C. to 15° C., said polyvinyl alcohol having a viscosity in 4% aqueous solution at 20° C. from 4 to 70 centipoises, and then removing unreacted monomeric material from the latex.

2. The method which comprises treating a synthetic rubber latex which is an aqueous emulsion polymerizate of synthetic rubber forming monomeric material selected from the group consisting of butadiene-1,3, isoprene, 2,3-dimethyl butadiene-1,3, and piperylene, and mixtures thereof, and mixtures of such butadienes-1,3 with up to 70% by weight of such mixtures of monoethylenic compounds which contain a $CH_2=C<$ group and are copolymerizable with butadienes-1,3, and which has been polymerized at 0° C. to 15° C. to a latex of 60% to 95% conversion, in the presence of at least 5% of residual unreacted polymerizable monomeric material based on the weight of the original synthetic rubber forming monomeric material with 0.02 to 2 parts of polyvinyl alcohol per 100 parts by weight of original synthetic rubber forming monomeric material at a temperature from 0° C. to 15° C., said polyvinyl alcohol having a viscosity in 4% aqueous solution at 20° C. from 4 to 70 centipoises, and then removing unreacted monomeric material from the latex.

3. The method of making a synthetic rubber latex which comprises treating a synthetic rubber latex which is an aqueous emulsion polymerizate of synthetic rubber forming monomeric material selected from the group consisting of butadiene-1,3, isoprene, 2,3-dimethyl butadiene-1,3, and piperylene, and mixtures thereof, and mixtures of such butadienes-1,3, and which has been polymerized at 0° C. to 15° C. with up to 70% by weight of such mixtures of monoethylenic compounds which contain a $CH_2=C<$ group and are copolymerizable with butadienes-1,3 to a latex of 60% to 95% conversion, in the presence of at least 5% of residual unreacted polymerizable monomeric material based on the weight of the original synthetic rubber forming monomeric material with 0.02 to 2 parts of polyvinyl alcohol and 0.2 to 2 parts of alkali salt electrolyte selected from the group consisting of potassium, sodium, ammonium and amine salts per 100 parts by weight of original synthetic rubber forming monomeric material at a temperature from 0° C. to 15° C., said polyvinyl alcohol having a viscosity in 4% aqueous solution at 20° C. from 4 to 70 centipoises, and then removing unreacted monomeric material from the latex.

4. The method which comprises treating a synthetic rubber latex which is an aqueous emulsion polymerizate of synthetic rubber forming monomeric material selected from the group consisting of butadiene-1,3, isoprene, 2,3-dimethyl butadiene-1,3, and piperylene, and mixtures thereof, and mixtures of such butadienes-1,3 with up to 70% by weight of such mixtures of monoethylenic compounds which contain a $CH_2=C<$ group and are copolymerizable with butadienes-1,3, and which has been polymerized at 0° C. to 15° C. to a latex of 60% to 95% conversion, in the presence of at least 5% of residual unreacted polymerizable monomeric material based on the weight of the original synthetic rubber forming monomeric material with 0.05 to 1 part of polyvinyl alcohol per 100 parts by weight of original synthetic rubber forming monomeric material at a temperature from 0° C. to 15° C., said polyvinyl alcohol having a viscosity in 4% aqueous solution at 20° C. from 4 to 70 centipoises, and then removing unreacted monomeric material from the latex.

5. The method which comprises treating a synthetic rubber latex which is an aqueous emulsion polymerizate of synthetic rubber forming monomeric material selected from the group consisting of butadiene-1,3, isoprene, 2,3-dimethyl butadiene-1,3, and piperylene, and mixtures thereof, and mixtures of such butadienes-1,3 with up to 70% by weight of such mixtures of monoethylenic compounds which contain a $CH_2=C<$ group and are copolymerizable with butadienes-1,3, and which has been polymerized at 0° C. to 15° C. to a latex of 60% to 95% conversion, in the presence of at least 5% of residual unreacted polymerizable monomeric material based on the weight of the original synthetic rubber forming monomeric material with 0.05 to 1 part of polyvinyl alcohol and 0.2 to 2 parts of alkali salt electrolyte selected from the group consisting of potassium, sodium, ammonium and amine salts per 100 parts by weight of original synthetic rubber forming monomeric material at a temperature from 0° C. to 15° C., said polyvinyl alcohol having a viscosity in 4% aqueous solution at 20° C. from 4 to 70 centipoises, and then removing unreacted monomeric material from the latex.

6. The method which comprises treating a synthetic rubber latex which is an aqueous emulsion polymerizate of a mixture of butadiene-1,3 and up to 70% of said mixture of styrene, and which has been polymerized at 0° C. to 15° C. to a latex of 60% to 95% conversion, in the presence of at least 5% of residual unreacted polymerizable monomeric material based on the weight of the original synthetic rubber forming monomeric material with 0.02 to 2 parts of polyvinyl alcohol per 100 parts by weight of original synthetic rubber forming monomeric material at a temperature from 0° C. to 15° C., said polyvinyl alcohol having a viscosity in 4% aqueous solution at 20° C. from 4 to 70 centipoises, and then removing unreacted monomeric material from the latex.

7. The method which comprises treating a synthetic rubber latex which is an aqueous emulsion polymerizate of a mixture of butadiene-1,3 and up to 70% of said mixture of styrene, and which has been polymerized at 0° C. to 15° C. to a latex of 60% to 95% conversion, in the presence of at least 5% of residual unreacted polymerizable monomeric material based on the weight of the original synthetic rubber forming monomeric material with 0.05 to 1 part of polyvinyl alcohol and 0.2 to 2 parts of alkali salt electrolyte selected from the group consisting of potassium, sodium, ammonium and amine salts per 100 parts by weight of original synthetic rubber forming monomeric material at a temperature from 0° C. to 15° C., said polyvinyl alcohol having a viscosity in 4% aqueous solution at 20° C. from 4 to 70 centipoises, and then removing unreacted monomeric material from the latex.

8. The method of making a concentrated synthetic rubber latex which comprises treating a synthetic rubber latex which is an aqueous emulsion polymerizate of synthetic rubber forming monomeric material selected from the group consisting of butadiene-1,3, isoprene, 2,3-dimethyl butadiene-1,3, and piperylene, and mixtures thereof, and mixtures of such butadienes-1,3 with up to 70% of such mixtures of monoethylenic compounds which contain a $CH_2=C<$ group and are copolymerizable with butadienes-1,3, and which has been polymerized to a latex of 60% to 95% conversion and a solids content of 20% to 50%, in the presence of at least 5% of residual unreacted polymerizable monomeric material based on the weight of the original synthetic rubber forming monomeric material with 0.02 to 2 parts of polyvinyl alcohol per 100 parts by weight of original synthetic rubber forming monomeric material at a temperature from 0° C. to 15° C., said polyvinyl alcohol having a viscosity in 4% aqueous solution at 20° C. from 4 to 70 centipoises, and then removing unreacted monomeric material from the latex and creaming the latex to a solids content of 55% to 70% with a vegetable mucilage creaming agent.

9. The method of making a concentrated synthetic rubber latex which comprises treating a synthetic rubber latex which is an aqueous emulsion polymerizate of synthetic rubber forming monomeric material selected from the group consisting of butadiene-1,3, isoprene, 2,3-dimethyl butadiene-1,3, and piperylene, and mixtures thereof, and mixtures of such butadienes-1,3 with up to 70% of such mixtures of monoethylenic compounds which contain a $CH_2{=}C<$ group and are copolymerizable with butadienes-1,3, and which has been polymerized to a latex of 60% to 95% conversion and a solids content of 20% to 50%, in the presence of at least 5% of residual unreacted polymerizable monomeric material based on the weight of the original synthetic rubber forming monomeric material with 0.02 to 2 parts of polyvinyl alcohol per 100 parts by weight of original synthetic rubber forming monomeric material at a temperature from 0° C. to 15° C., said polyvinyl alcohol having a viscosity in 4% aqueous solution at 20° C. from 4 to 70 centipoises, and then removing unreacted monomeric material from the latex and evaporating water from the latex until the latex is concentrated to a solids content of 55% to 70%.

10. The method of making a concentrated synthetic rubber latex which comprises treating a synthetic rubber latex which is an aqueous emulsion polymerizate of synthetic rubber forming monomeric material selected from the group consisting of butadiene-1,3, isoprene, 2,3-dimethyl butadiene -1,3, and piperylene, and mixtures thereof, and mixtures of such butadienes-1,3 with up to 70% of such mixtures of monoethylenic compounds which contain a $CH_2{=}C<$ group and are copolymerizable with butadienes-1,3, and which has been polymerized to a latex of 60% to 95% conversion and a solids content of 20% to 50%, in the presence of at least 5% of residual unreacted polymerizable monomeric material based on the weight of the original synthetic rubber forming monomeric material with 0.02 to 2 parts of polyvinyl alcohol and 0.2 to 2 parts of alkali salt electrolyte selected from the group consisting of potassium, sodium, ammonium and amine salts per 100 parts by weight of original synthetic rubber forming monomeric material at a temperature from 0° C. to 15° C., said polyvinyl alcohol having a viscosity in 4% aqueous solution at 20° C. from 4 to 70 centipoises, and then removing unreacted monomeric material from the latex and evaporating water from the latex until the latex is concentrated to a solids content of 55% to 70%.

11. The method of making a concentrated synthetic rubber latex which comprises treating a synthetic rubber latex which is an aqueous emulsion polymerizate of synthetic rubber forming monomeric material selected from the group consisting of butadiene-1,3, isoprene, 2,3-dimethyl butadiene-1,3, and piperylene, and mixtures thereof, and mixtures of such butadienes-1,3 with up to 70% of such mixtures of monoethylenic compounds which contain a $CH_2{=}C<$ group and are copolymerizable with butadienes-1,3, and which has been polymerized at 0° C. to 15° C. to a latex of 60% to 95% conversion and a solids content of 20% to 50%, in the presence of at least 5% of residual unreacted polymerizable monomeric material based on the weight of the original synthetic rubber forming monomeric material with 0.02 to 2 parts of polyvinyl alcohol per 100 parts by weight of original synthetic rubber forming monomeric material at a temperature from 0° C. to 15° C., said polyvinyl alcohol having a viscosity in 4% aqueous solution at 20° C. from 4 to 70 centipoises, and then removing unreacted monomeric material from the latex and evaporating water from the latex until the latex is concentrated to a solids content of 55% to 70%.

12. The method of making a concentrated synthetic rubber latex which comprises treating a synthetic rubber latex which is an aqueous emulsion polymerizate of synthetic rubber forming monomeric material selected from the group consisting of butadiene-1,3, isoprene, 2,3-dimethyl butadiene-1,3 and piperylene, and mixtures thereof, and mixtures of such butadienes-1,3 with up to 70% of such mixtures of monoethylenic compounds which contain a $CH_2{=}C<$ group and are copolymerizable with butadienes-1,3, and which has been polymerized to a latex of 60% to 95% conversion and a solids content of 20% to 50%, in the presence of at least 5% of residual unreacted polymerizable monomeric material based on the weight of the original synthetic rubber forming monomeric material with 0.05 to 1 part of polyvinyl alcohol and 0.2 to 2 parts of alkali salt electrolyte selected from the group consisting of potassium, sodium, ammonium and amine salts per 100 parts by weight of original synthetic rubber forming monomeric material at a temperature from 0° C. to 15° C., said polyvinyl alcohol having a viscosity in 4% aqueous solution at 20° C. from 4 to 70 centipoises, and then removing unreacted monomeric material from the latex and evaporating water from the latex until the latex is concentrated to a solids content of 55% to 70%.

13. The method of making a concentrated synthetic rubber latex which comprises treating a synthetic rubber latex which is an aqueous emulsion polymerizate of a mixture of butadiene-1,3 and up to 70% of said mixture of styrene, and which has been polymerized at 0° C. to 15° C. to a latex of 60% to 95% conversion and a solids content of 20% to 50%, in the presence of at least 5% of residual unreacted polymerizable monomeric material based on the weight of the original synthetic rubber forming monomeric material with 0.02 to 2 parts of polyvinyl alcohol per 100 parts by weight of original synthetic rubber forming monomeric material at a temperature from 0° C. to 15° C., said polyvinyl alcohol having a viscosity in 4% aqueous solution at 20° C. from 4 to 70 centipoises, and then removing unreacted monomeric material from the latex and evaporating water from the latex until the latex is concentrated to a solids content of 55% to 70%.

14. The method of making a concentrated synthetic rubber latex which comprises treating a synthetic rubber latex which is an aqueous emulsion polymerizate of a mixture of butadiene-1,3 and up to 70% of said mixture of styrene, and which has been polymerized at 0° C. to 15° C. to a latex of 60% to 95% conversion and a solids content of 20% to 50%, in the presence of at least 5% of residual unreacted polymerizable monomeric material based on the weight of the original synthetic rubber forming monomeric material with 0.02 to 2 parts of polyvinyl alcohol and 0.2 to 2 parts of alkali salt electrolyte selected from the group consisting of potassium, sodium, ammonium and amine salts per 100 parts by weight of original synthetic rubber forming monomeric material at a temperature from 0° C. to 15° C., said polyvinyl alcohol having a viscosity in 4% aqueous solution at 20° C. from 4 to 70 centipoises, and then removing unreacted monomeric material from the latex and evaporating water from the latex until the latex is concentrated to a solids content of 55% to 70%.

15. The method of making a concentrated synthetic rubber latex which comprises treating a synthetic rubber latex which is an aqueous emulsion polymerizate of a mixture of butadiene-1,3 and up to 70% of said mixture of styrene, and which has been polymerized at 0° C. to 15° C. to a latex of 60% to 95% conversion and a solids content of 20% to 50%, in the presence of at least 5% of residual unreacted polymerizable monomeric material based on the weight of the original synthetic rubber forming monomeric material with 0.05 to 1 part of polyvinyl alcohol per 100 parts by weight of original synthetic rubber forming monomeric material at a temperature from 0° C. to 15° C., said polyvinyl alcohol having a viscosity in 4% aqueous solution at 20° C. from 4 to 70 centipoises, and then removing unreacted monomeric material from the latex and evaporating water from the latex until the latex is concentrated to a solids content of 55% to 70%.

16. The method of making a concentrated synthetic rubber latex which comprises treating a synthetic rubber latex which is an aqueous emulsion polymerizate of a mixture of butadiene-1,3 and up to 70% of said mixture of styrene, and which has been polymerized at 0° C. to 15° C. to a latex of 60% to 95% conversion and a solids content of 20% to 50%, in the presence of at least 5% of residual unreacted polymerizable monomeric material based on the weight of the original synthetic rubber forming monomeric material with 0.05 to 1 part of polyvinyl alcohol and 0.2 to 2 parts of alkali salt electrolyte selected from the group consisting of potassium, sodium, ammonium and amine salts per 100 parts by weight of original synthetic rubber forming monomeric material at a temperature from 0° C. to 15° C., said polyvinyl alcohol having a viscosity in 4% aqueous solution at 20° C. from 4 to 70 centipoises, and then removing unreacted monomeric material from the latex and creaming the latex to a solids content of 55% to 70% with a vegetable mucilage creaming agent.

References Cited in the file of this patent

UNITED STATES PATENTS

| | | |
|---|---|---|
| 2,138,073 | Schweitzer | Nov. 29, 1938 |
| 2,444,801 | Arundale | July 6, 1948 |
| 2,481,876 | Rhines | Sept. 13, 1949 |
| 2,897,168 | Brown | July 28, 1959 |
| 3,004,942 | Brown | Oct. 17, 1961 |